(12) United States Patent
Kinney, Jr. et al.

(10) Patent No.: US 11,868,324 B2
(45) Date of Patent: *Jan. 9, 2024

(54) REMOTE DURABLE LOGGING FOR JOURNALING FILE SYSTEMS

(71) Applicant: Amazon Technologies, Inc., Seattle, WA (US)

(72) Inventors: James Edward Kinney, Jr., Seattle, WA (US); Khawaja Salman Shams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 780 days.

This patent is subject to a terminal disclaimer.

(21) Appl. No.: 16/415,944

(22) Filed: May 17, 2019

(65) Prior Publication Data

US 2019/0272260 A1 Sep. 5, 2019

Related U.S. Application Data

(63) Continuation of application No. 14/303,549, filed on Jun. 12, 2014, now Pat. No. 10,303,663.

(51) Int. Cl.
*G06F 16/10* (2019.01)
*G06F 16/18* (2019.01)

(52) U.S. Cl.
CPC ................ *G06F 16/1873* (2019.01)

(58) Field of Classification Search
CPC .................................. G06F 16/1873
See application file for complete search history.

(56) References Cited

U.S. PATENT DOCUMENTS

| | | | |
|---|---|---|---|
| 5,280,612 A | 1/1994 | Lorie et al. | |
| 5,471,614 A | 11/1995 | Kakimoto | |
| 5,524,205 A | 6/1996 | Lomet et al. | |
| 5,530,850 A | 6/1996 | Ford et al. | |

(Continued)

FOREIGN PATENT DOCUMENTS

| | | |
|---|---|---|
| EP | 0675451 | 4/1995 |
| EP | 1277115 | 1/2003 |

OTHER PUBLICATIONS

U.S. Appl. No. 13/169,391, filed Jun. 27, 2011, Carlos A. Arguelles.

(Continued)

*Primary Examiner* — Kristopher Andersen
(74) *Attorney, Agent, or Firm* — Robert C. Kowert; Kowert, Hood, Munyon, Rankin & Goetzel P.C.

(57) ABSTRACT

A journaling file system may implement remote durable logging. Updates to a file system may be received, and log records describing the updates may be stored in a locally-accessible file system change log. The update may then be acknowledged as committed. The log records may then be sent to be stored in a network-based data store in a remote version of the file system change log. Once it may be determined that the log records are stored in the remote version, storage space for the log records in the local file system change log may be reclaimed. Various types of restoration and duplication techniques may be implemented based on the remote version of the change log to restore a file system at an originating device or to duplicate the file system at a different device.

20 Claims, 12 Drawing Sheets

(56) References Cited

U.S. PATENT DOCUMENTS

| | | | |
|---|---|---|---|
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,253 B2 | 8/2006 | Hinshaw et al. | |
| 7,146,386 B2 | 12/2006 | Xiao | |
| 7,305,386 B2 | 12/2007 | Hinshaw et al. | |
| 7,308,456 B2 | 12/2007 | Friske et al. | |
| 7,415,489 B2 | 8/2008 | Palapudi et al. | |
| 7,472,138 B2 | 12/2008 | Adkins et al. | |
| 7,716,645 B2 | 5/2010 | Dolby et al. | |
| 7,747,663 B2 | 6/2010 | Atkin et al. | |
| 7,809,778 B2 | 10/2010 | Mitaru | |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,131,723 B2 | 3/2012 | Sim-Tang | |
| 8,209,515 B2 | 6/2012 | Schott | |
| 8,255,627 B2 | 8/2012 | Blinick et al. | |
| 8,266,107 B2 | 9/2012 | Fashchik et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,397,032 B2 | 3/2013 | Elnozahy | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,943,282 B1 | 1/2015 | Armangau et al. | |
| 2002/0107835 A1 | 8/2002 | Coram et al. | |
| 2002/0143733 A1 | 10/2002 | Mukkamalla et al. | |
| 2002/0143888 A1* | 10/2002 | Lisiecki | H04L 67/1095 709/217 |
| 2003/0046121 A1 | 3/2003 | Menninger et al. | |
| 2004/0133622 A1 | 7/2004 | Clubb et al. | |
| 2004/0249869 A1 | 12/2004 | Oksanen | |
| 2005/0262161 A1 | 11/2005 | Holmes et al. | |
| 2008/0168081 A1 | 7/2008 | Gaurav et al. | |
| 2008/0183973 A1 | 7/2008 | Aguilera et al. | |
| 2008/0208924 A1 | 8/2008 | Bradshaw et al. | |
| 2009/0024551 A1 | 1/2009 | Agrawal et al. | |
| 2009/0193393 A1 | 7/2009 | Baldwin et al. | |
| 2010/0050172 A1 | 2/2010 | Ferris | |
| 2010/0192131 A1 | 7/2010 | Dolby et al. | |
| 2011/0035548 A1 | 2/2011 | Kimmel et al. | |
| 2011/0161496 A1 | 6/2011 | Nicklin | |
| 2011/0213781 A1* | 9/2011 | Hansel | G06F 16/273 707/754 |
| 2012/0041899 A1 | 2/2012 | Greene et al. | |
| 2012/0143825 A1 | 6/2012 | Boehm et al. | |
| 2012/0174112 A1 | 7/2012 | Vaidya et al. | |
| 2012/0191648 A1 | 7/2012 | Kuber et al. | |
| 2012/0297073 A1 | 11/2012 | Glover et al. | |
| 2012/0310985 A1 | 12/2012 | Gale et al. | |
| 2013/0007219 A1 | 1/2013 | Sorenson, III et al. | |
| 2013/0036281 A1 | 2/2013 | Revah et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2014/0149590 A1 | 5/2014 | Mallipeddi et al. | |

OTHER PUBLICATIONS

Amazon Web Services Blog Downloaded Apr. 30, 2013 from http://aws.typepad .com/aws/201 0/1 0/amazon-rdsannouncing-read-replicas.html, Published Oct. 5, 201 0 pp. 1-11.

U.S. Appl. No. 14/070,359, filed Nov. 1, Samuel James Mckelvie.

Bloom Filter Downloaded from http://en.wikipedia.org/wiki/Bioom_filteron May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11 g: SQL Query Result Set Caching" published Jul. 30, 2008, downloaded May 15, 2013 from http://www.databasejournal.com/features/oracle/article.php/3760761 /Oracle-Database-11 g-SQL -Query-DResult-Set-Caching.htm, pp. 1-7.

Oracle Database JDBC Developer's Guide and Reference: Chapter 20 Statement and Result Set 5 Cachingdownloaded from http://docs.oracle.com/cd/B28359 01 /java .1111 b31224/stmtcach.htm via the Wayback Machine Nov. 27, 2011, pp. 1-8.

Adrian Billington "Query Result Cache in Oracle 11 g" downloaded from http:/lweb.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28, 2012, downloaded from http://juliandontcheff. word press. com/20 12/08/28/bloom-filters-for- db as/ on May 14, 2013, pp. 1-4.

Julian Dyke "Result Cache Internals" Nov. 2007, pp. 1-38.

Michele Cyran et al "Oracle Database Concepts 1 Og Release 2 (1 0.2)" Oct. 2005, pp. 1-542.

Lance Ashdown et al "Oracle Database Concepts 11 g Release 2 (11 .2)" Sep. 2011, pp. 1-460.

Isolation (database systems) downloaded from http://en.wikipedia.org/wiki/Isolation_(database_systems) on May 15, 2013, pp. 1-7.

U.S. Appl. No. 14/070,362, filed Nov. 1, Samuel James Mckelvie.
U.S. Appl. No. 14/070,355, filed Nov. 1, Samuel James Mckelvie.
U.S. Appl. No. 14/070,350, filed Nov. 1, Samuel James Mckelvie.
U.S. Appl. No. 14/070,347, filed Nov. 1, Samuel James Mckelvie.

Adrian Proctor "Non-Volatile Memory: Non Volatile Memory and its use in Enterprise Applications" 2012. whitepaper downloaded from http://www.vikingtechnology.com/sites/default/files/featuredvideos/NVDIMM_Technology.pdf, pp. 1-8.

U.S. Appl. No. 13/872,530, filed Apr. 29, 2013; Samuel James Mckelvie.

Yuan Xie "Emerging NVM Memory Technologies", Penn State Department of Computer Science and Engineering, Downloaded from http://web.engr.oregonstate.edu/~sllu/xie.pdf on Aug. 13, 2013, pp. 1-31.

NV-DIMM: Fastest Tier in Your Storage Strategy, 2012 Whitepaper, Viking Technology, pp. 1-7.

U.S. Appl. No. 13/967,185, filed Aug. 14, 2013, Anurag Windlass Gupta.

IBM, "Storage Class Memory : Towards a Disruptively Low-Cost Solid-State Non-Volatile Memory", Almaden Research Center; Jan. 2013, pp. 1-27.

GitHub-Gist, "Latency Numbers Every Programmer Should Know", pp. 1-6.

Technology Lab/ Information Technology, Sean Gallagher, "Memory That Never Forgets: Non-Volatile DIMMS Hit the Market", Apr. 4, 2013; pp. 1-3.

* cited by examiner

REMOTE DURABLE LOGGING FOR JOURNALING FILE SYSTEMS

This application is a continuation of U.S. patent application Ser. No. 14/303,549, filed Jun. 12, 2014, which is hereby incorporated by reference herein in its entirety.

BACKGROUND

File systems provide organization, management, and control of data. Control and durability mechanisms implemented as part of file systems affect the performance and resource efficiency of storage devices underlying a file system. Moreover, components or applications that rely upon the performance and durability of the file system may be affected by the tradeoffs inherent with accommodating both performance and durability goals. Journaling file systems are implemented in order to provide a greater measure of durability without posing too high a cost in performance. However, the physical limitations of journaling at a particular device limit the effectiveness of journaling file systems, reducing performance gains (or blunting measures to prevent performance losses) or lowering the durability of the file system.

Figure 1A:
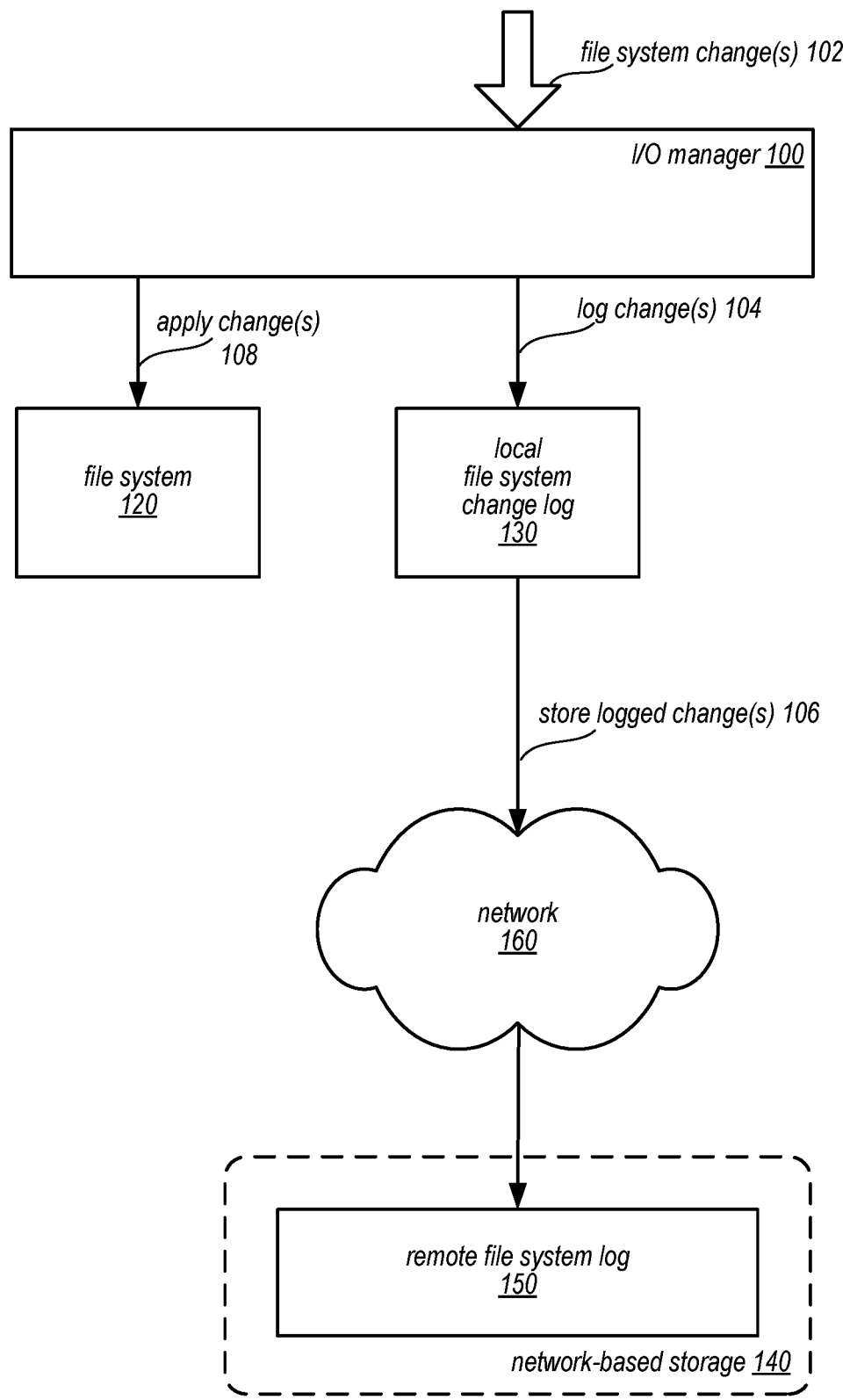
FIGS. 1A and 1B are block diagrams illustrating remote durable logging for a journaling file system and recovery, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of remote durable logging for journaling file systems are described herein. Journaling file systems may ensure durability for a file system in various embodiments by recording changes or updates to the file system in a persistent file system change log. Log records indicating the respective updates are stored that describe one or more steps to apply an updated, such as deleting a particular file, directory, or data within a file system. For instance, a log record describing a change to mapping information or an index structure may be stored, along with a log record describing new data written to correspond to the change in mapping information, such as storing a new file in the file system. Journaling file systems typically store log records in a file system change log in a local, persistent storage device (often times within the file system itself). As the file system change log grows or becomes more full, some log records may be removed (when it is determined that the file system itself reflects the update described by the removed log records). Recovery for file journaling systems may be limited to the log records in the local file system change log.

For journaling file systems implementing remote durable logging, recovery or restoration operations, as well as duplicating file systems or other file system management activities, may become more fine grained, as a greater number of log records may be maintained providing access to the state of a file system over wider range of time. Moreover, as log records may be stored in a network-based data store, the log records may be easily disseminated to duplicate or provide access to the file system across multiple systems, without requiring a direct connection between the original device maintaining the file system and other devices desiring to access the file system. FIG. 1A illustrates remote durable logging for journaling file systems, according to some embodiments.

I/O manager 100 may be implemented as part of various Input/Output (I/O) components or functionalities configured to handle I/O for a file system 120. File system 120 may be maintained on one or more persistent block storage devices. Similarly, file system change log 130 may be maintained on one or more persistent block storage devices (which may be the same as file system 120). As indicated at 102, file system changes 102 may be received at I/O manager 100. These changes may be any modification of the file system, such as writing new data to particular files or objects, modifying a file system or object structure, deleting files or data, modifying permissions or formats of data, files, or objects of a file system, or any other change to a file system (e.g., changes to file system metadata or content). In at least some embodiments, changes may be indicated as write requests. Once received, the changes may be logged 104 as log records in file system change log 130. Log records may each corresponding to a particular location in a log order or sequence. In various embodiments, each log record may indicate a particular log sequence number (LSN) corresponding to the log record sequence. One or multiple log records may correspond to a single received change 102, and may be stored in the order in which the steps described by the log records are performed, in various embodiments. In at least some embodiments, once the log records are stored, the change may be acknowledged as committed or durable.

Log records may then be lazily or asynchronously sent from file system change log 130 in locally accessible storage to network-based storage 150 maintaining a remote version of the file system change log 150 via network 160. In various embodiments, an access credential or other information used to verify access to the remote file system log may be included. More generally, various different access control techniques may be implemented. In at least some embodiments, once it may be determined that log records are stored in the remote file system log 150, the same log records may be reclaimed (storage space for the log records made available for storing new data) from file system change log 130.

In various embodiments, the changes received 102 may be applied 104 independently from when the log records are stored and the change acknowledged as committed. For example, a cache or buffer may be implemented to apply and store change requests to a copy of the data of the file system in system memory, and later, when it is efficient, apply the changes 104 to file system 120. However, in some embodiments, log records describing changes may read and used to apply the changes 104 to file system 120. Therefore, the previous example is not intended to be limiting.

In some embodiments, a snapshot of file system 120 may also be stored in network-based storage 140. The snapshot, along with the remote file system change log may be used to duplicate the file system at other storage devices. For example, an authorized device may be configured to mount a snapshot (or obtain it) from network-based storage 140 of file system 120 and then replay the log records in the remote file system log 150 to generate the current state of the file system 120, or a state of the file system at a particular time, such as discussed below with regard to FIGS. 7 and 8.

Figure 1B:
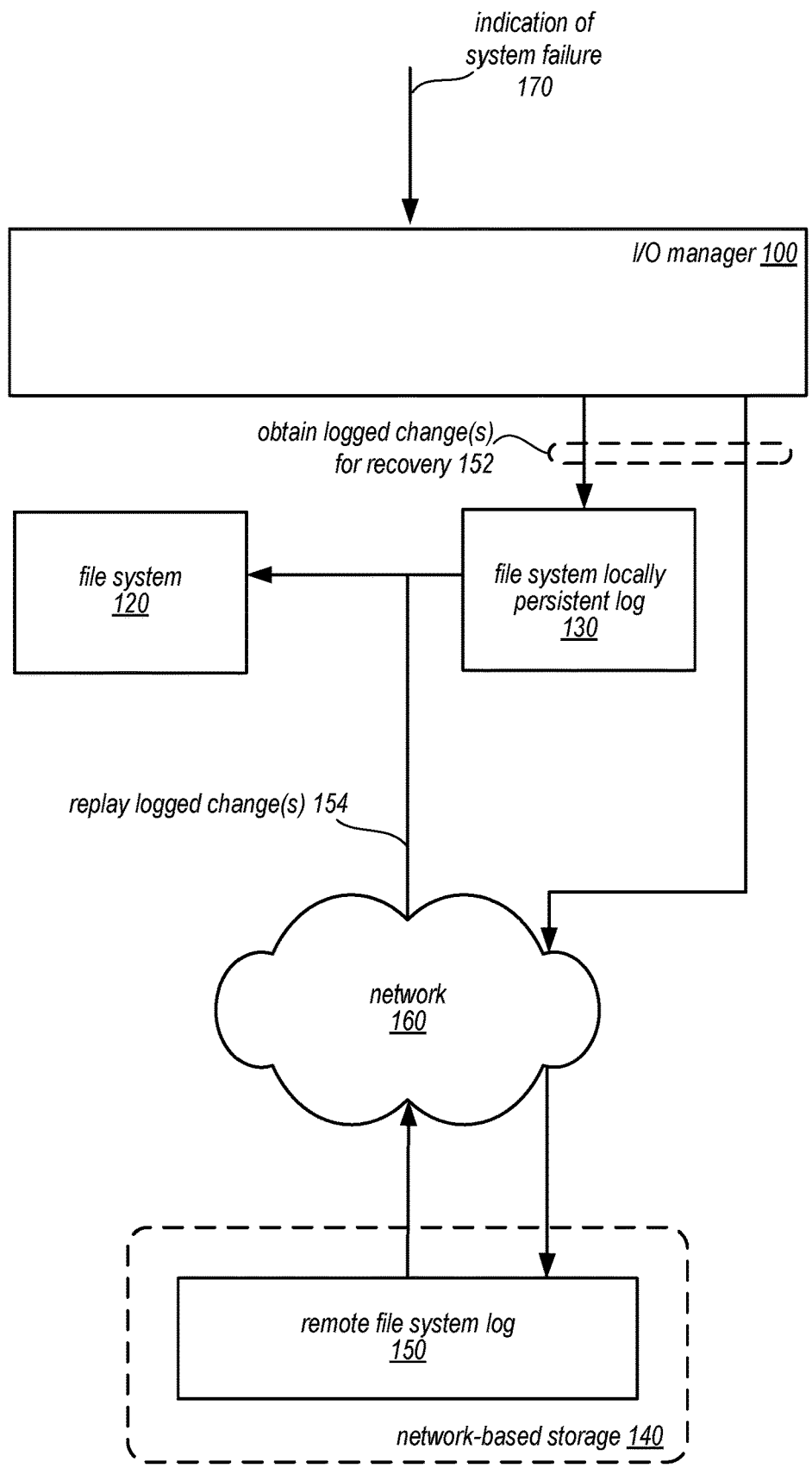

As noted above, changes may not always be applied to a file system when received. If a power or other system failure occurs prior to the changes being applied to the file system 120, then a recovery operation may need to be performed to obtain a current state of the file system, as discussed in detail below with regard to FIG. 7. FIG. 1B illustrates recovery from a system failure for a journaling file system implementing remote durable logging. An indication of the system failure 170 may be received. This indication 170 may be received as part of various communications, boot programs, or other initialization techniques performed upon recovering from a system failure. I/O manager 100 may be able to obtain log records from both local file system log 130 and remote file system log 150, as indicated at 152. The obtained log records may be reconciled, so that committed changes to the file system 120 may be applied by replaying the log records 154 associated with the committed changes. In this way, a restored version of file system 120 may be generated, which may be current up to a time immediately prior to the system failure. In at least some embodiments, only changes from remote file system log 150 may be replayed 154.

Please note, FIGS. 1A and 1B are provided as an illustration of remote durable logging for journaling file systems, and are not intended to be limiting as to the physical arrangement, size, or number of components, modules, or devices, described therein.

The specification first describes an example of different clients implementing journaling file systems that perform remote durable logging. A distributed storage service may then be discussed that stores remote file system change logs and snapshots for clients, in various embodiments. A journaling file system service is also described that coordinates, manages, or extends remote durable logging for journaling file systems to other client devices that may access a duplicate or version of the file system. The specification then describes flowcharts of various embodiments of methods for implementing remote durable logging for journaling file systems and for journaling file system services. Next, the specification describes an example system that may implement the disclosed techniques. Various examples are provided throughout the specification.

Figure 2:
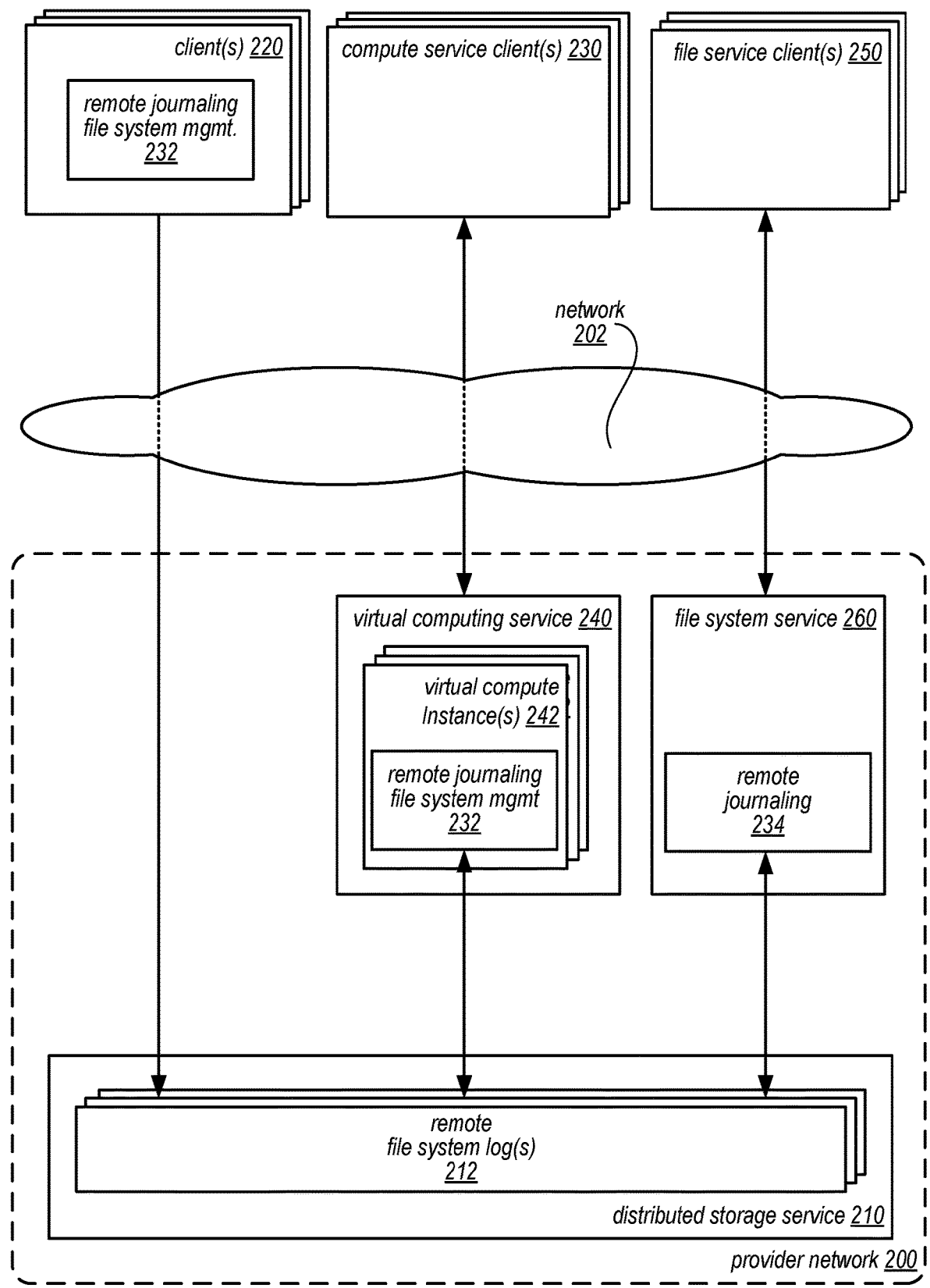
FIG. 2 is a block diagram illustrating a network-based service system architecture that may be configured to provide a distributed storage service for remote durable logging for journaling file systems, according to some embodiments.

FIG. 2 is a block diagram illustrating a network-based service system architecture that may be configured to provide a distributed storage service for remote durable logging for journaling file systems, according to some embodiments. In the illustrated embodiment, a number of clients, client(s) 220, 230, or 250 may be configured to communicate with a distributed storage service 210 as part of provider network 200. Provider network 200 may be set up by an entity such as a company or a public sector organization to provide one or more services (such as various types of cloud-based computing or storage) accessible via the Internet and/or other networks to clients. Provider network 200 may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200. In various embodiments, provider network may implement many different network-based services such as distributed storage service 210, virtual computing service 240, file system service 260 and/or one or more other virtual computing services. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment 2000 illustrated in FIG. 11 and described below. In various embodiments, the functionality of a given service system component (e.g., a component of distributed storage service 210, virtual computing service 240 or file system service 260) may be implemented by a particular node or may be distributed across several nodes. In some embodiments, a given node may implement the functionality of more than one service system component (e.g., more than one distributed storage service system component).

Generally speaking, clients may encompass any type of client configurable to submit network-based services requests to network-based services in provider network 200 via network 260, including requests for storage services (e.g., a request to store log records for remote file system log(s) 212, etc.). In at least some embodiments, network-based service requests may include network-based storage protocol requests to store log records, including access credentials for the particular log 212 associated with the particular client. However, some requests may also be made according various different kinds of other network-based protocols (e.g., Network File System (NFS)). For example, a given client 220 may include a suitable version of a web browser, or may include a plug-in module or other type of code module configured to execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients may be configured to generate network-based services requests according to a Representational State Transfer (REST)-style network-based services architecture, a document- or message-based network-based services architecture, or another suitable network-based services architecture.

Clients 220 may convey network-based services requests (e.g., storing log records) to and receive responses from distributed storage service 210. For clients of other services, such as compute service client(s) 230 or file service client(s) 250, send requests and receive responses via network 202 from virtual computing service 240 and file system service 260 respectively. In various embodiments, network 202 may encompass any suitable combination of networking hardware and protocols necessary to establish network-based-based communications between clients and services or systems in provider network 200. For example, network 202 may generally encompass the various telecommunications networks and service providers that collectively implement the Internet. Network 202 may also include private networks such as local area networks (LANs) or wide area networks (WANs) as well as public or private wireless networks. For example, both a given client and network-based services may be respectively provisioned within enterprises having their own internal networks. In such an embodiment, network 202 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and network-based services. It is noted that in some embodiments, clients may communicate with provider network using a private network rather than the public Internet.

In various embodiments, provider network 200 may implement components to coordinate the metering and accounting of client usage of network-based services, including storage resources, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing systems, or may maintain a database of usage data that may be queried and processed by external systems for reporting and billing of client usage activity. In certain embodiments, provider network 200 may implement components that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services, such as storage for remote file system logs 212 in distributed storage service 210.

In some embodiments, provider network 200 may implement components to implement user authentication and access control procedures. For example, for a given network-based services request to access a particular remote file system log 212, network provider 200 may implement components configured to ascertain whether the client associated with the request is authorized to store log records to the particular remote file system log 212. Authorization may be determined such by, for example, evaluating an identity, password or other credential against credentials associated with the particular remote file system log 212, or evaluating the requested access to the particular remote file system log 212 against an access control list for the particular remote file system log 212. For example, if a client does not have sufficient credentials to access the remote file system log 212, the request may be rejected, for example by returning a response to the requesting client indicating an error condition.

In at least some embodiments, virtual computing service 240 may implement virtual compute instances that are clients 242 of distributed storage service 210, as opposed to clients external 220 from provider network 200, configured to store log records in remote file system change log maintained for the compute instances 242 at distributed storage service 210. Virtual compute instances 242 may implement a remote journaling management component 232 (as part of operating a virtual compute instance for a compute service client 230) which may be configured to perform remote durable logging for a journaling file system implemented at the virtual compute instance 242.

Virtual compute service 240 may offer various compute instances to clients 250. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 240 in different embodiments, including general purpose or special purpose computer servers, storage devices, network devices and the like. In some embodiments instance clients 230 or other any other user may be configured (and/or authorized) to direct network traffic to a compute instance 242. In some embodiments, virtual compute instances may implement or perform various applications, tasks, or operations that may manage a file system. The file system may be stored locally at local persistent block-based storage for the compute instance 242, or maintain the file system at remote block storage offered by a block-based storage service (not illustrated). In various embodiments, compute instances 242 may mount a journaling file system and utilize remote journaling file system management component 232 to implement remote durable logging.

In at least some embodiments, file system service 260 may provide a remote file system for clients 250. The remote file system may be journaling file system and may implement remote journaling module 234 to perform remote durable logging according to the various techniques discussed below. Although not illustrated, file system service clients may be virtual compute instances 242, in some embodiments.

Figure 3:
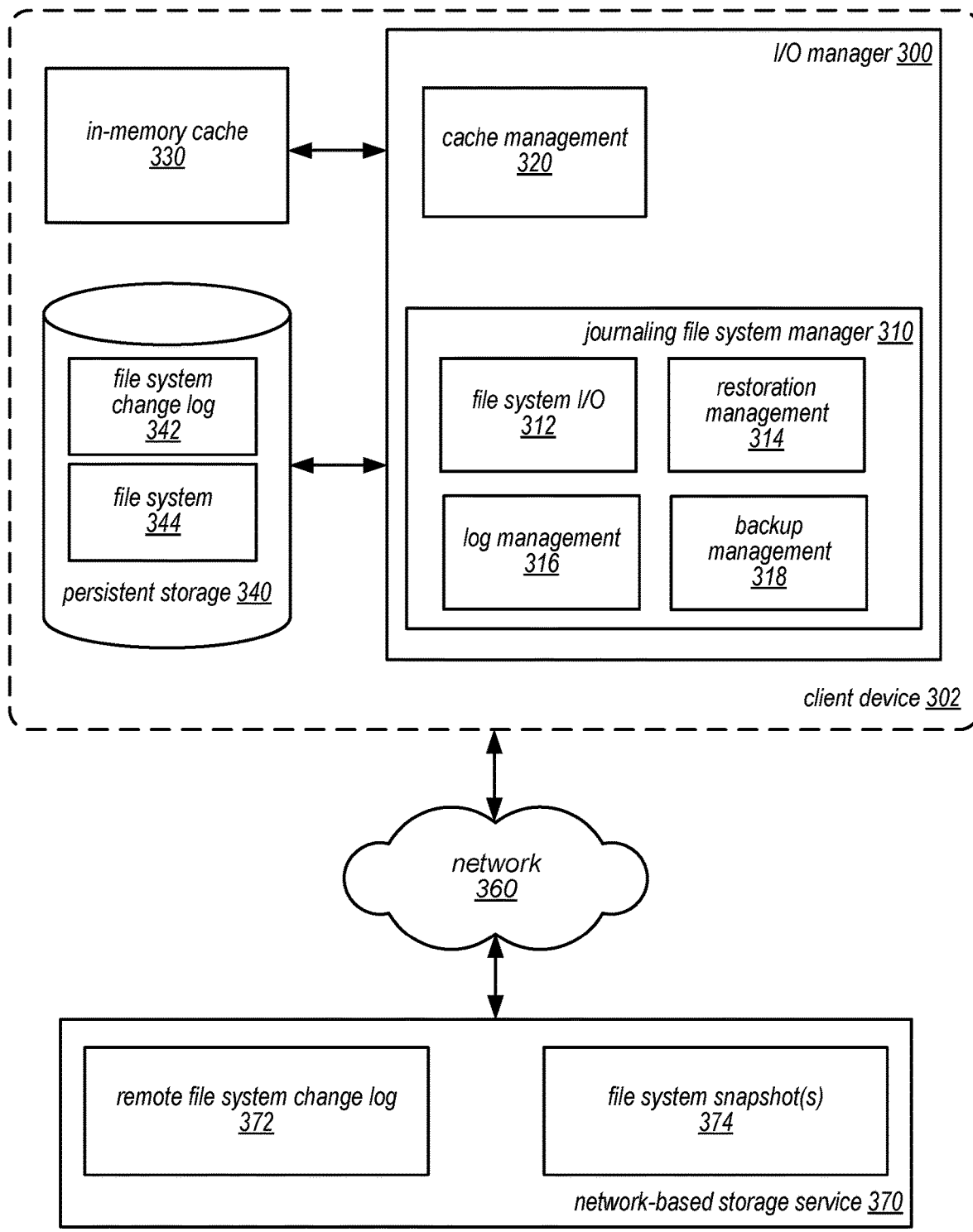
FIG. 3 is a block diagram illustrating various components of a journaling file system implementing remote durable logging, according to some embodiments.

Clients 220 may themselves implement remote journaling file system management 232 component as part of a journaling file system implemented at the client 220. FIG. 3, discussed in detail below, provides an example of remote journaling as may be implemented at client(s) 220 or other components, such as virtual compute instances 242, which provide remote journaling file system management 232 functionalities. Client(s) 220 may be, in some embodiments, mobile computing devices, such as laptops, mobile phones or tablet computers. In at least some embodiments, multiple different client devices may be utilized to access the same file system, allowing for file system access (and any operations/applications based on the file system access) to be performed flexibly, and at multiple different locations without using the same client device. For example, utilizing remote durable logging, changes made to a file system via mobile phone client device may be duplicated to a desktop computer client device that also maintains access to the same file system.

Distributed storage service 210 may, in various embodiments, provide storage remote file system logs 212 as well as snapshots for file systems. Distributed storage service 360 may be highly durable data store that provides redundant storage and may be implemented as various types of storage, such as object storage (e.g., key value storage) for storage clients, virtual block-based storage, database systems, or any other storage schemes, formats, or techniques. Distributed storage service 360 may implement multi-tenant storage, in some embodiments. Thus, data stored for one storage client may be physically stored or processed at a same location or node as data for another client or customer account (which may or may not be snapshots or remote file system logs).

The various remote journaling management components discussed above may be implemented in many different ways. FIG. 3 illustrates an example journaling file system manager that implements remote durable logging, according to some embodiments. Client device 302, which may be clients 220, virtual compute instances 242, or portions of file system service 260 discussed above, may communicate over network 360 (similar to network 202 above) with network-based storage service 370. Network-based storage service 370 may be similar to distributed storage service 210 in some embodiments. Client device 302 may send snapshots to be persistently stored in file system snapshots 374 and log records to be stored in remote file system change log 372 in network-based storage service 370.

In various embodiments, client device 302 may implement I/O manager 300 which may be configured to direct Input/Output (I/O) between various components of client device 302. In various embodiments, I/O manager 302 may be implemented as part of a kernel in an operation system for device 302. I/O manager 302 may handle changes to a file system, among other I/O. In some embodiments, an in-memory cache 330 may be implemented in a volatile system memory device (such as memory 2020 described below in FIG. 11). Updates to a file system may be initially stored in in-memory cache 330, which may be a page cache in some embodiments. Cache manager 320 may be implemented to periodically flush the contents of the in-memory cache to be applied to file system 344 in persistent storage 340. For instance, a flush operation may be used to apply dirty or modified pages in in-memory cache 330 to their respective locations in file system 344. Please note, that in some embodiments in-memory cache 330 may not be implemented and/or changes to the file system may be flushed or copied from file system change log 342 to 344. Thus, the previous example is not intended to be limiting.

In various embodiments, I/O manager 300 may implement journaling file system manager 310, which may be configured to implement various journaling techniques, including remote durable logging, as well as other techniques discussed below with regard to FIGS. 6-10. File system I/O module 312 may be implemented to handle received updates for the file system 344. For example, an update request involving multiple steps may be received, and file system I/O module 312 may be configured to store log records describing the update in file system change log 342, acknowledge the update, and send the log records via network 360 for storage in remote file system change log 372. Log management module 316 may be implemented to apply log records from file system change log 342 to file system 344, in some embodiments. In at least some embodiments, log management module 316 may be configured to determine whether log records are stored in remote file system change log 362 and reclaim storage space for the log records in file system change log 342 in persistent storage 340 (e.g., deleting, marking, or otherwise making the storage space available to store new data, such as new log records).

In various embodiments, journaling file system manager 310 may implement backup management module 318. Backup management module 318 may direct or send snapshots of file system 344 to be stored in file system snapshots 374. For example, backup management module 318 may block all application of changes to file system 344 while a copy of the file system 344 is sent to network-based storage service 370 as a new snapshot. In various embodiments, journaling file system manager 310 may implement restoration management module 314. Restoration management module 314 may be configured to restore a file system to a current or near current state prior after the occurrence of a system failure, such as described below with regard to FIG. 7. For instance, restoration management module 314 may obtain log records from both remote file system change log 372 and/or local file system change log 342 and reconcile them to identify committed updates for file system 344. Restoration management module 314 may apply the completed updates to restoration snapshot, either obtained locally based on the version of file system 344 maintained at persistent storage 340 or from a snapshot obtained from file system snapshots 374 in network-based data storage service 370 to generate a restored version of file system 344 to be stored.

Client device 302 may implement persistent storage 340 for maintaining file system 344 and file system change log 342. In some embodiments, file system change log 342 may be maintained within file system 344. Persistent storage 340 may be one or more persistent block storage devices including, but not limited to, hard disk drives (HDDs) or solid state drives (SDDs).

Figure 4:
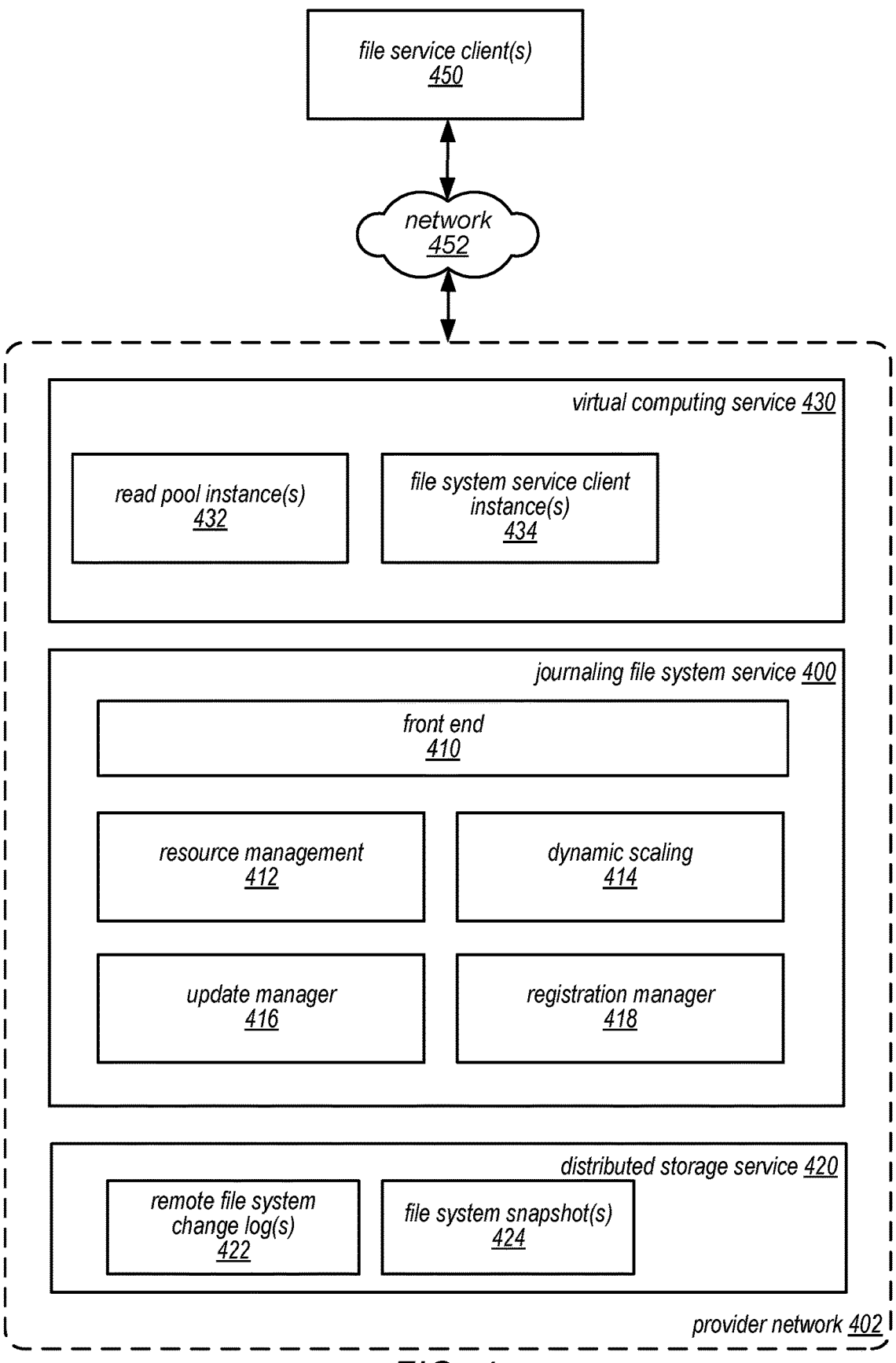
FIG. 4 is a block diagram illustrating a journaling file system service, according to some embodiments.

Although the techniques of remote durable journaling have been discussed in the context of individual systems, components or devices implementing journaling file systems. Other systems or services may be implemented to extend or coordinate the use of remote versions of file system change logs created as part of remote durable logging. FIG. 4 is a block diagram illustrating a to journaling file system service, according to some embodiments. One or more computing nodes or systems, such as computing system 2000 described below in FIG. 11 may implement the various components of journaling file system service 400, virtual computing service 430, and/or distributed storage service 420. Journaling file system service 400 may coordinate or extend the remote durable logging for journaling file systems. File service clients, which may be any one of clients 220, 230 and 250 discussed above with regard to FIG. 450 may access journaling file system service 400 via network 452 (similar to network 202 discussed above) or file system service client instances 434 (which may be similar to virtual compute instances 242) discussed above. File system journaling service 400 may also coordinate interactions between distributed storage service 420 and virtual computing service 430.

In various embodiments, journaling file system service 400 may implement a front end module 410. Front end module 410 may be configured to receive service requests and forward the requests or initiate the appropriate response from resource management module 412, dynamic scaling module 414, update manager 416, or registration manager 418. In various embodiments front module 410 may be configured to translate requests for journaling file system service 400 according to a programmatic interface (API) for the service 400 and/or receive, process, indicate requests received via another interface, such as user interface implemented via a web site.

In various embodiments, journaling file system service 400 may implement registration manager 418. Registration manager 418 may be configured to register file systems for clients 450 or instances 434. For example, registration manager may store information linking particular storage accounts at distributed storage service 420 to particular clients 450. Registration manager 450 may, in some embodiments, store access credentials or other information for clients 450 to access distributed storage service 420. In various embodiments, journaling file system service 400 may implement resource management module 412. Resource management module 412 may be configured to allocate storage space in distributed storage service 420 for remote file system change log 422 for a particular client 450, as well space for a file system snapshot 424. For instance, resource management module may send a request formatted according to an API for distributed storage service 420 to create storage containers for change log 422 and file system snapshot 424. Resource management module 412 may also provide access credentials and other identification information to clients 450 or instances 434 in order to access the particular change log 422 and snapshot 424 for a particular client 450. Resource management module may also be configured to provision read pool instances 432 in virtual computing service 430 according to the various techniques discussed below with regard to FIGS. 5 and 10, in response to client requests.

In various embodiments, journaling file system service 400 may implement dynamic scaling module 414. Dynamic scaling module may monitor read traffic at read pools and detect scaling events with regard to different traffic thresholds. For example, an additional read pool instance 432 may be added to a read pool for a particular client 450 if read requests for the pool exceed a throughput capacity threshold. Similarly, an instance 432 may be removed if read requests fall below a throughput utilization threshold. In various embodiments, journaling file system service 400 may implement an update manager 416. Update manager 416 may, in some embodiments, detect or provide updated versions of file systems to read pool instances 432. For example update manager 416 may poll remote file system change log 422 for a particular file system with a read pool implemented. In response to detecting additional log records, update manager 416 may send the additional log records to be included in the duplicated versions of the file system maintained in the read pool instances 432.

Please note that the previous description of FIG. 4 is provided for illustrative purposes only and is not intended to be limiting as to the number, arrangement, or configuration of various components implementing the functionalities described.

Figure 5:
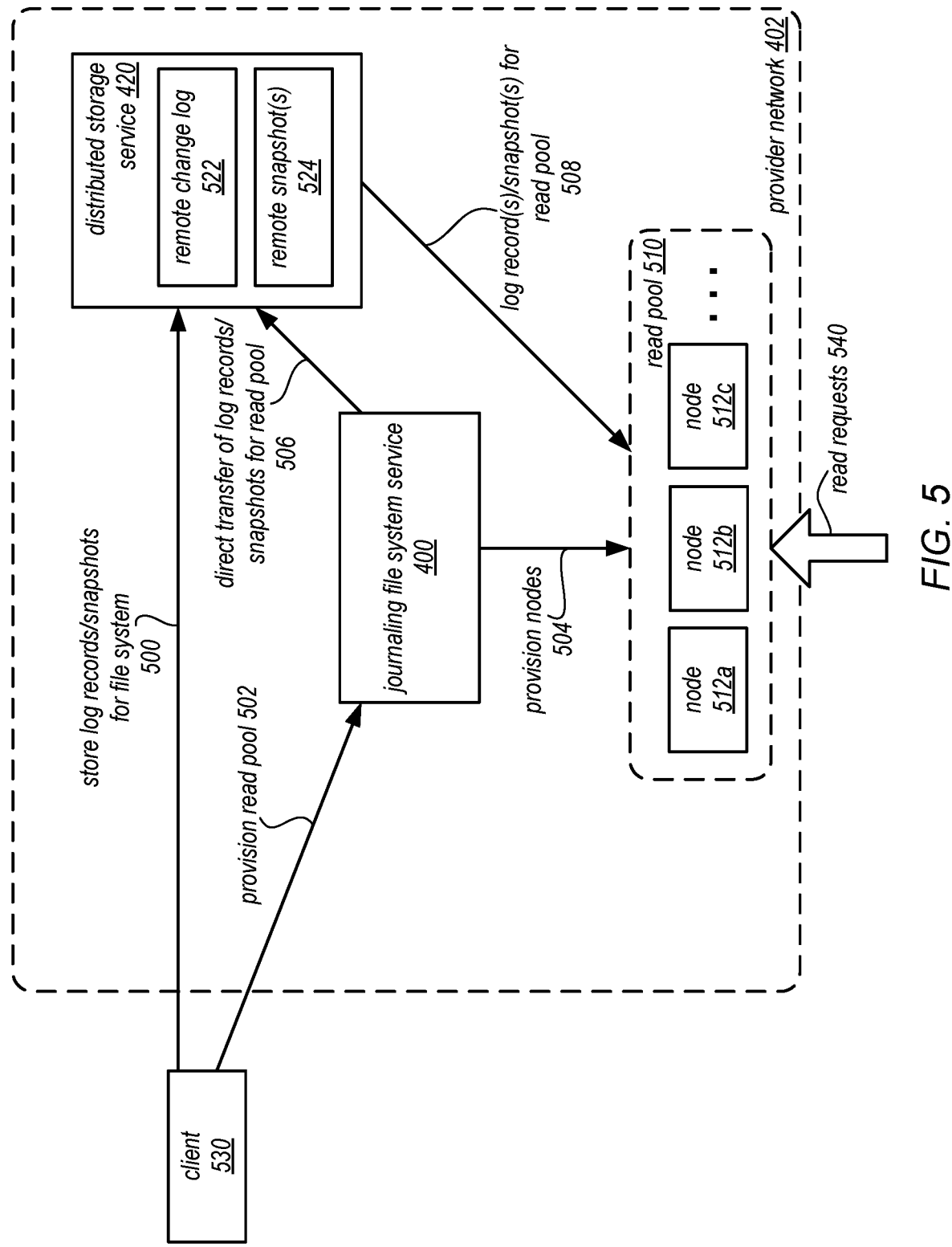
FIG. 5 is a block diagram illustrating provisioning of read pools by a journaling file system service for a file system implementing remote durable logging, according to some embodiments.

FIG. 5 is a block diagram illustrating provisioning of read pools by a journaling file system service for a file system implementing remote durable logging, according to some embodiments. Client 530 may be one of clients 220, 230 or 250 illustrated above in FIG. 2. However, as illustrated in FIG. 5, client 530 is external to the provider network, and may be implementing a remote journaling file system, such as remote journaling file system management module 232, also discussed above. Thus, client 530 may store log records and snapshots 500 for a file system managed by client 530 at distributed storage service 420 in the respective remote change log 522 for the file system and remote snapshot(s) 524. In a least some embodiments, client 530 may register the file system with journaling file system service 400 (not illustrated).

In order to establish a read pool for the file system, client 530 may send a provision request 502 for a read pool to journaling file system service 400. The request may be formatted according an API for the journaling system service and may describe the expected use of the read pool, such as the workload (e.g., IOPS) or number of read requests. Journaling file system service 400 may be configured to determine a number nodes for the read pool 510 (e.g., based on the throughput capacity required to service the identified workload) and provision the number of nodes 512 for read pool 510. For example, read pool 510 includes nodes 512a, 512b, and 512c respectively. In at least some embodiments, nodes 512 may be provisioned from another service in provider network 402, such as virtual computing service 430 described above in FIG. 4. Nodes 512 may be physical or virtualized storage nodes, in various embodiments. For example, an API call may be sent to the virtual computing service indicating the number of nodes, their prospective function (e.g., read pool nodes), and a customer account to charge for the use of the nodes, in one example.

However provisioned, journaling file system service 400 may then direct the transfer of log records and snapshots 506 from distributed storage service. For instance, journaling file system service may initiate a transfer from remote change log 522 associated with client 530's file system and a remote snapshot 524 associated with client 530's file system. When registering the file system, client 530 may in some embodiments provide access credentials for journaling file system service to facilitate the transfer. The log records and snapshots may be sent to the read pool 508, storing them respectively at each of the nodes 512a, 512b, and 512c. The nodes may then generate a duplicate version of the file system to be accessed. Journaling file system service 400 may activate a load balancer or other gatekeeping/traffic coordinators for nodes 512 of read pool 510. Read requests 540 may then be received and service at nodes 512 for the duplicated version of the file system.

Figure 10:
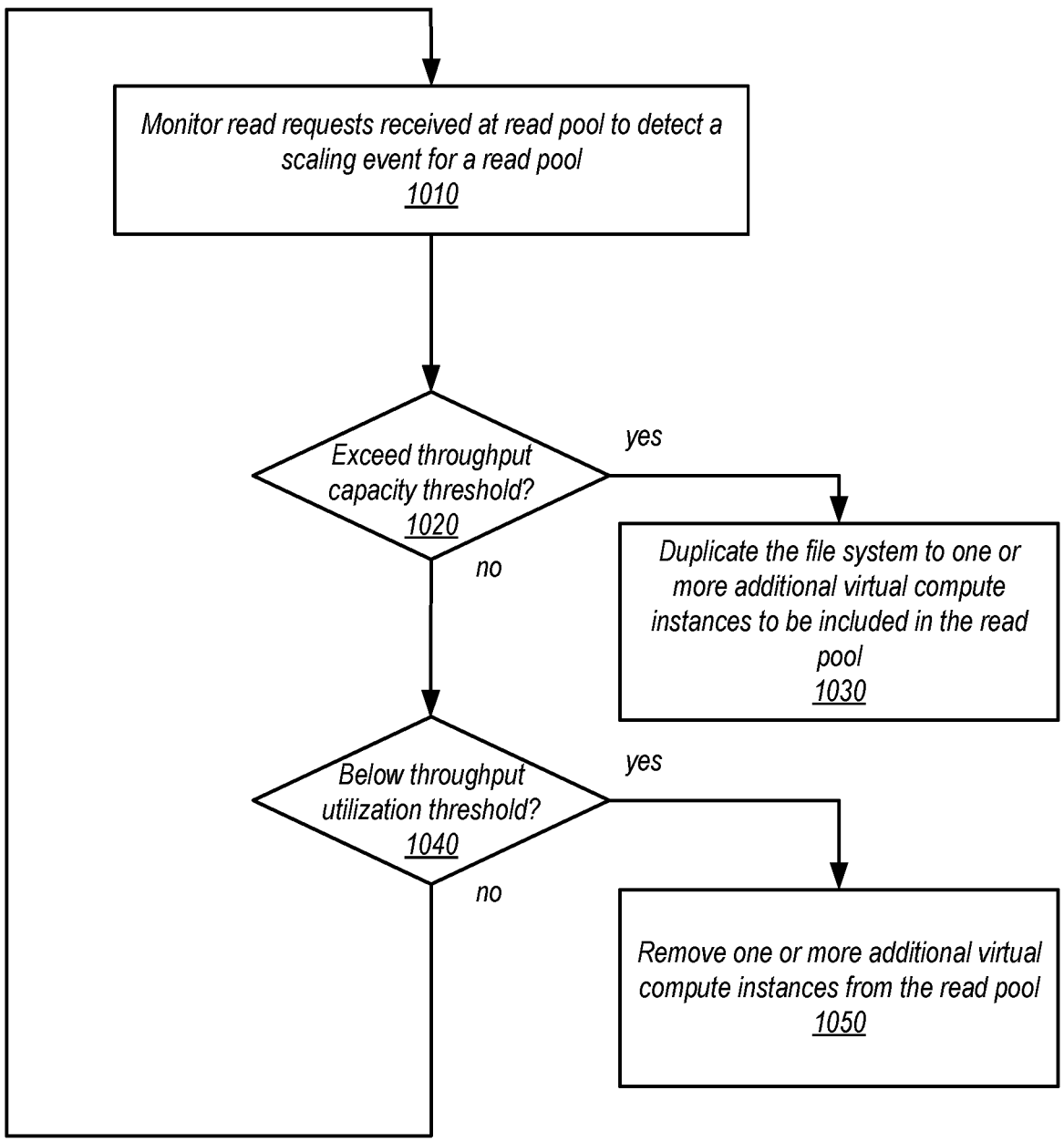
FIG. 10 is a high-level flowchart for illustrating methods and techniques for scaling read pools for a version of a file system, according to some embodiments.

Although not illustrated, journaling file system service may dynamically scale the nodes in read pool 510, according to the techniques described below with regard to FIG. 10. For example, an additional node may be added if read requests 540 exceed a throughput capacity threshold. Similarly, a node may be removed (e.g., node 512c) if read requests 540 fall below a throughput utilization threshold.

Note that in various embodiments, the programmatic interfaces (API) calls and responses described in FIGS. 1-5 above and FIGS. 6-10 below may be performed over a secure proxy connection (e.g., one managed by a gateway control plane), or may be performed over the public network or, alternatively, over a private channel such as a virtual private network (VPN) connection. These and other APIs to and/or between components of the systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with a network-based data store, client device implementing remote durable logging, or other system, service, component, or device.

Figure 6:
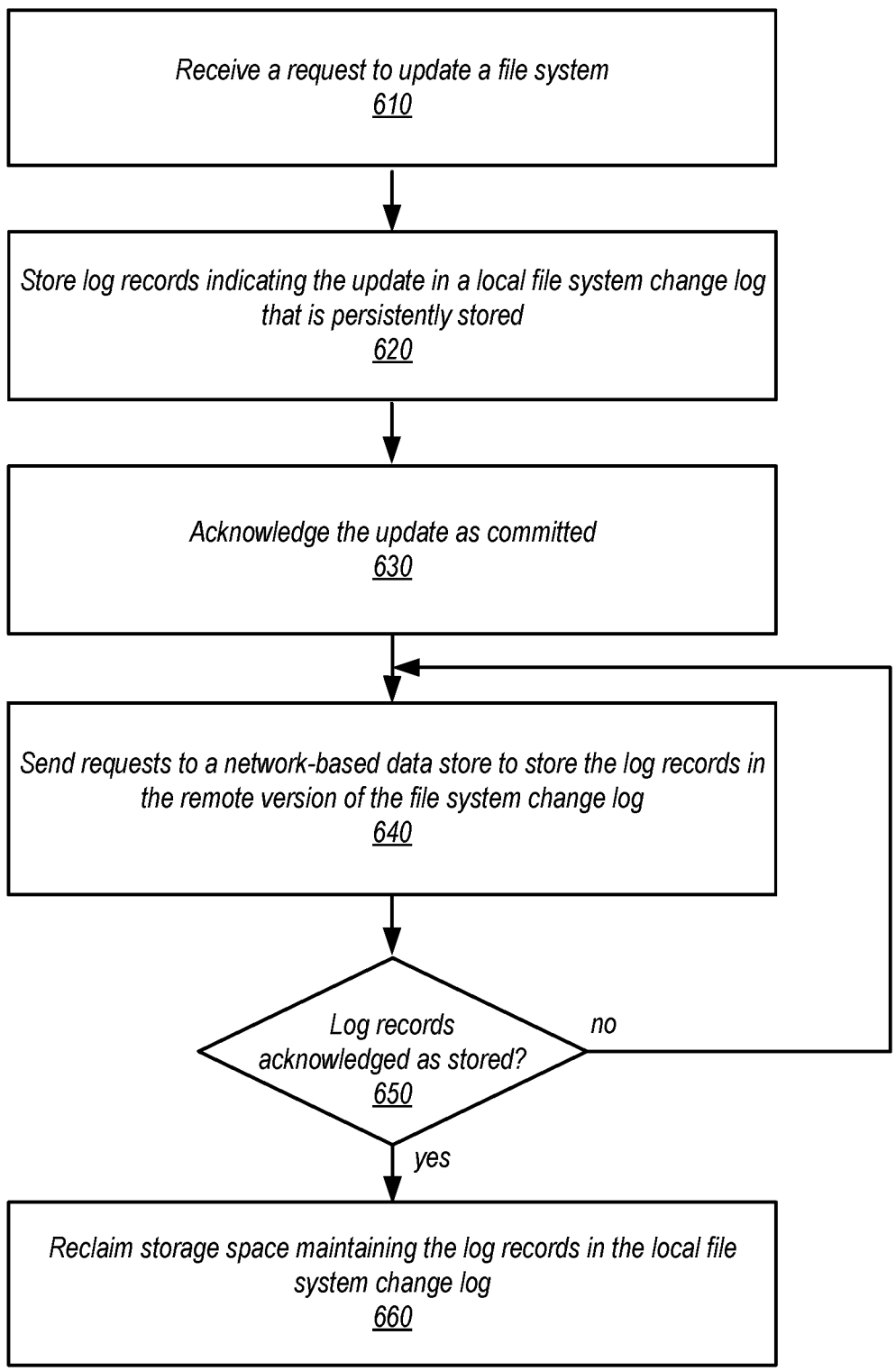
FIG. 6 is a high-level flowchart illustrating methods and techniques for implementing remote durable logging for a journaling file system, according to some embodiments.

The various embodiments of remote durable logging for journaling file systems with regard to FIGS. 2-5 above, may utilize remote versions of a file system change log in different ways. Moreover, remote durable logging for journaling file systems is not limited to such systems. Various other kinds of journaling file systems or devices that implement journaling file systems may implement remote durable logging. File systems themselves may vary widely in type, scheme or implementation. For example, in some embodiments, raw block storage may be considered a scheme or approach to storing data and thus may be considered a file system. Moreover, many different devices may implement remote durable logging for journaling file systems, including mobile computing devices, such as tablet computers, laptops, mobile phones, or personal digital assistants. FIG. 6 is a high-level flowchart illustrating methods and techniques for implementing remote durable logging for a journaling file system, according to some embodiments. Different combinations of systems and/or devices may implement the various techniques discussed below.

As indicated at 610, a request may be received to update a file system. The update request may be writing new data to particular files or objects, modifying a file system or object structure, deleting files or data, modifying permissions or formats of data, files, or objects of the file system, or any other modification to the file system. In at least some embodiments, updates may involve multiple steps. For example, moving a file or directory may include: modifying mapping information to indicate the new location, copying the file to the new location, deleting the file from the old location, and modifying the mapping information to remove the indication of the old location. Updates may include changes to the contents of a file system, or metadata of a file system, in some embodiments. As indicated at 620, log records indicating the update may be stored in a local file system change log that is persistently stored. Continuing with the above example, log records may describe each of the steps of modifying mapping information to indicate the new location, copying the file to the new location, deleting the file from the old location, and modifying the mapping information to remove the indication of the old location may be stored. Please note that some updates may be atomic or performed in one step. In various embodiments, log records indicating the transaction may be stored prior to their performance. Thus, each of the log records indicating the steps in the update may be stored, whether or not those changes have been performed at the persistent storage device maintaining the file system. Log records may be implemented in many different ways, and at many different granularities. Log records may reflect changes to individual data blocks, or larger collections of blocks, such as data pages. Log records may indicate the change in many different ways, such as by providing a copy or new version of the data block including the change or may describe or indicate the change (e.g., in a block change vector).

As indicated at 630, in response to storing the log records, the update may be acknowledged as committed. For example, the client device or other system implementing the journaling file system may receive an indication from an I/O manager, file system driver, or other component indicating that the change to the file system is committed (or considered durable). In some embodiments, a log record may be stored that specifically indicates that the update is considered committed. The commitment log record may be stored in the local file system change log after the log records indicating the other steps, in a multi-step update.

As indicated at 640, in various embodiments requests may be sent to the network-based data store to store the log records for the update in a remote version of the file system change log. Requests may be formatted according to various storage protocols, or formatted according to a programmatic interface (API) for the network-based data store (e.g., "PUT log record 1234 in log object"). In at least some embodiments, an access credential may be obtained for accessing the network-based data store. For instance, a read-only device, such as an optical disk or flash storage drive, may be connected to a client that stores an access credential (e.g., security token, key, username/password, or any other identifier that can be used to verify authorization of access at the network-based data store). In some embodiments, an identification system or service may authenticate a client by submitting identification information, such as a username or password, and provide access credentials in return. The access credentials may be included with requests to store the log records, or may be used to establish a connection to store the log records.

In various embodiments, sending the log records for storage in the remote version of the file system change log at the network-based data store may be performed asynchronously with respect to storing log records in the local file system change log and acknowledging the update as committed. For example, receiving the update, locally storing the log records, and acknowledging the update as committed may be performed as part of foreground process. Meanwhile, sending the log records to the network-based data store to be stored in the remote version of the file system change log may be performed as a background process. In at least some embodiments, multiple threads may be used to send the log records from the local file system change log to the remote version in the network-based data store in parallel (or near parallel). Thus, log records may be stored in the remote version of the file system change log out-of-order. However, as noted above, log records may include a sequence number (LSN) which may allow the proper ordering of the log to be reconstructed at a later time (e.g., when replaying log records for duplication or restoration as discussed below in FIGS. 7 and 8).

A determination may be made whether the log records are acknowledged as stored at the network-based data store, as indicated at 650. For instance, acknowledgements may be received from the network-based data store for successful storage of a particular log record. If so, as indicated by the positive exit from 650, then the storage space in the persistent storage (e.g., persistent block storage device) maintaining the log records may be reclaimed, as indicated at 660. For instance, the storage space may be marked, formatted, deleted, or otherwise identified as available for storing other data, such as new log records for the local file system change log. In this way, the log records in the local file system change log may only describe changes back to a relatively short period of time (e.g., 2 minutes) as compared to the remote version of the file system which may store log records covering a larger expanse of time (e.g., 2 days or 2 weeks) which may be used for restoration and/or duplication as discussed below with regard to FIGS. 7 and 8. If the log records are not acknowledged, as indicated by the negative exit from 650, then in some embodiments new requests to store the log records may be sent.

Figure 7:
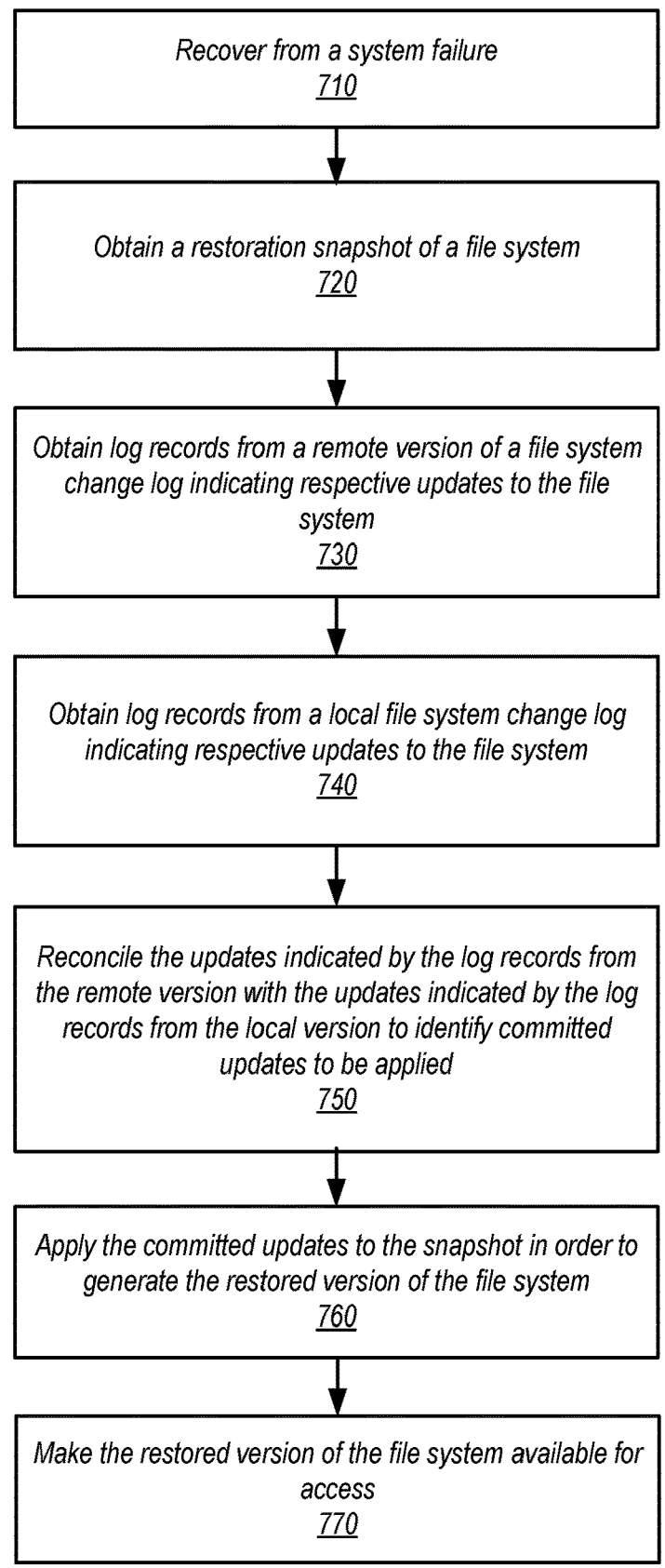
FIG. 7 is a high-level flowchart illustrating methods and techniques for restoring a journaling file system implementing remote durable logging upon system failure, according to some embodiments.

File system change logs may provide a record of updates made to a file system. A noted above these updates may include any changes from writing new data to particular files or objects, modifying a file system or object structure, deleting files or data, modifying permissions or formats of data, files, or objects of the file system, or any other modification to the file system. One or more log records may be recorded, corresponding, to each of these updates, in a local and remote file system change log for journaling file systems implementing remote durable logging. Restoring from system failures may account for the log records stored in the local and remote file system change logs, providing greater durability for the file system. A backup system or service, for instance, may implement the techniques discussed below in order to provide fine-grained restoration to a point in time near the system failure. FIG. 7 is a high-level flowchart illustrating methods and techniques for restoring a journaling file system implementing remote durable logging upon system failure, according to some embodiments.

As indicated at 710, a system failure may occur. For example, a power failure or other loss of data in a volatile data store (e.g., updates not yet applied to the persistent storage maintaining the file system) may be a system failure. Upon recovery of the system failure, a restoration snapshot may be obtained, as indicated at 720. In at least some embodiments, the restoration snapshot may be the file system stored in locally accessible storage. However, a snapshot may be stored in another storage location, such as the network-based data store storing the remote version of the file system change log. This snapshot may be obtained as the restoration snapshot (e.g., requested and received from the network-based data store). As noted above, a snapshot of a file system may provide a state of the file system (e.g., data, structures, formats, settings, etc.) at a particular point in time. The restoration snapshot may be, in various embodiments, the latest snapshot in time, nearest to the time the system failure occurred. However, older snapshots may also be restoration snapshots.

As indicated at 730, log records may be obtained from a remote version of the file system change log indicating respective updates to the file system, in various embodiments. These log records may be requested or received from the network-based data store. In some embodiments, a subset of the remote version of the file system change log may be obtained, while in other embodiments the entire log may be obtained. As indicated at 740, log records may also be obtained from a local file system change log, such as discussed above with regard to FIG. 6, in various embodiments. These log records from the local file system change log may also describe updates to the file system. In at least some embodiments, these log records may be obtained from the remote data store in parallel.

As indicated at 750, updates indicated by the log records from the local file system change log and the remote version of the file system change log may be reconciled to identify committed updates, in various embodiments. Log records may corresponding to particular updates, as noted above, and may also provide a position indicator, such as a log sequence number, indicating the location of the log record in the file system change log. Reconciling the updates may, in various embodiments, include comparing the last committed update in the log records from the remote version of the file system change log and the local version of the file system change log. Many times, the local file system change log may store one more committed updates that have not yet been stored in the remote version. Thus, any committed updates included in the local file system change log may be identified for inclusion in the restored file system. However, the local file system change log may no longer store updates that have already been stored in the remote version of the file system change log. Thus, committed updates described in log records from the remote version may also be selected. Any overlapping committed updates, described in both the log records from the file system may be selected only once. In effect, the selected updates may be combined to form a single portion of the file system change log to be applied (e.g., log records with LSNs 10000-10100 from the remote version and log records with LSNs from 10101-10120 may be selected to be applied as committed updates). Some log records may be stored in the file system change logs, which may be associated with updates that are incomplete. If, for example, the system failure occurred before a multi-step update could be complete, some log records stored in the file system change logs may record the complete steps of the incomplete update. However, a completion (committed) log record may be stored at the end of log records that are associated with a single update, so that incomplete updates may be identified. As log records may be stored in the file system change logs in order, there may only be one incomplete update, typically the last update recorded in the file system change log. Please note, that more than one update may be incomplete in the remote version of the file system as, in some embodiments, log records may be stored in remote version of the file system change log out-of-order (as discussed above in FIG. 6). Moreover, in some embodiments, only those changes stored in the remote data store may be selected for application to the snapshot.

As indicated at 760, committed updates may be applied to generate the restored version of the file system, in various embodiments. As the log records may be applied to the restoration snapshot according to the respective sequence of updates to the file system change log, the changes may be effectively be replayed to generate the restored version of the file system. Thus the effects described in the log records (e.g., move this portion of data, change this mapping structure, link, or pointer) may be performed in the same order to recreate the restored file system. As indicated at 770, once the restored file system is generated, the restored version of the file system may be made available for access (e.g., write and/or read access), in various embodiments.

Figure 8:
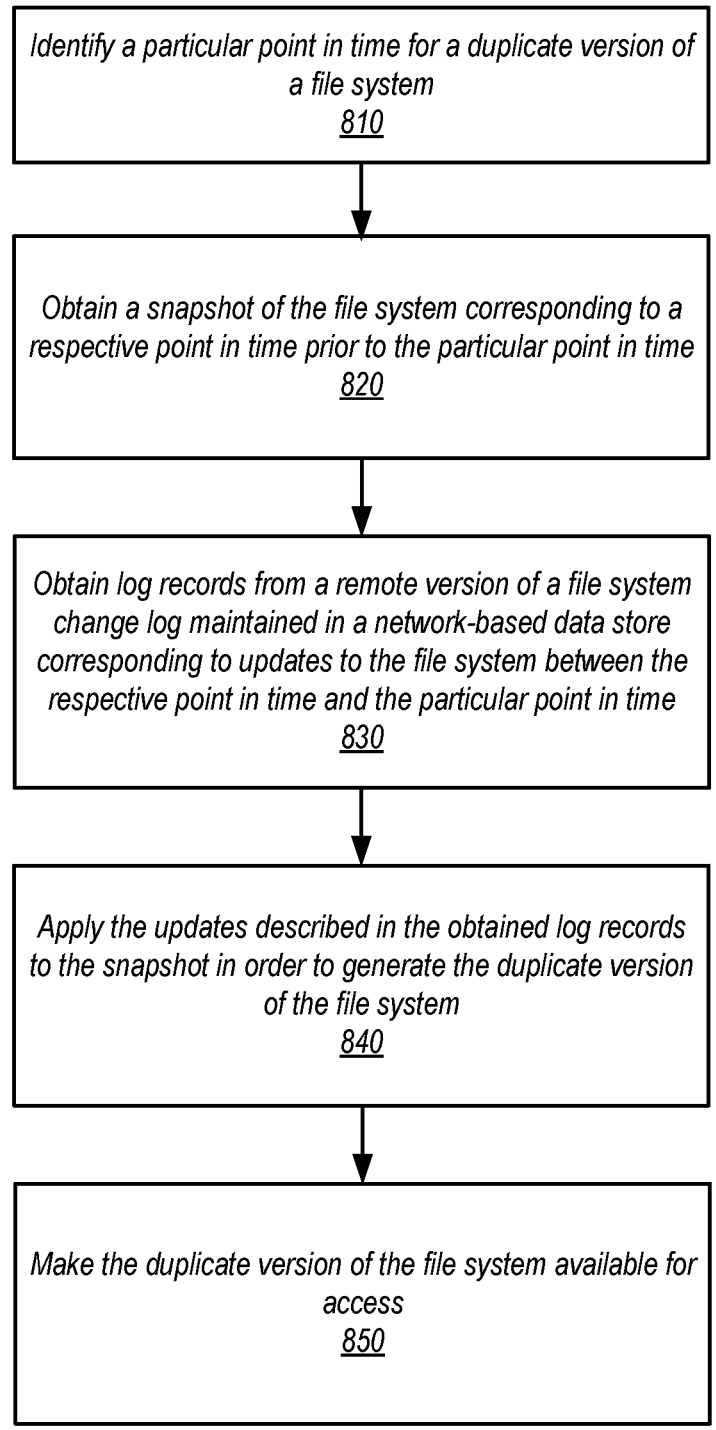
FIG. 8 is a high-level flowchart for illustrating methods and techniques for duplicating a file system implementing remote durable journaling, according to some embodiments.

In addition to providing greater durability and flexibility for performing restoration operations, journaling file systems that implement remote durable journaling may allow for efficient sharing or duplication of the file system. Many different services or systems may implement duplication techniques. For instance, a journaling file system service, as described above with regard to FIG. 4, may utilize duplication to provide additional read-only, write-only, or read-write duplicates of a file system for other systems, components, or devices to access. Scientific data for performing various analyses may be duplicated onto multiple different systems in order to allow for independent processing and verification, for instance. Other types of systems or services, such as backup systems or services may implement duplication to clone or recreate a file system that was lost along with, for example, an original computing device hosting the file system. In some embodiments, duplication techniques may be implemented as part of mounting a duplicate version of a file system. FIG. 8 is a high-level flowchart for illustrating methods and techniques for duplicating a file system implementing remote durable logging, according to some embodiments.

As indicated at 810, a particular point in time for a duplicate version of a file system may be identified, in some embodiments. For example, for duplication techniques that are implemented for sharing or providing access to a specific version of a file system, a particular point in time may be used to generate the specific version of the file system. If, for instance, a development team wished to run certain tests on data in a file system as of a particular date, then the particular point in time for that version of the file system corresponding to the data may be identified. As the remote version of the file system change log may maintain many more log records than may be stored at a local file system change log, the granularity at which a particular point in time for a duplicate version of the file system may be very fine. For instance, a particular day, hour, minute, second, or even millisecond may be correspond to a particular point the file system change log, and thus log records describing updates leading to that particular point may be identified.

As indicated at 820, a snapshot of the file system corresponding to a respective point in time prior to the desired particular point in time may be obtained. As noted above, a network-based data store may maintain one or more snapshots of a file system, associated with different respective points in time. One, or more than one, of these snapshots may correspond to a prior point in time, therefore, in some embodiments, the snapshot obtained may be the closest or most recent snapshot that is prior to the desired particular point in time. For example, a particular point in time desired may be 12:02:26 May 6, 2014. Snapshots time-stamped as 12:00:00 May 6, 2014, 11:00:00 May 6, 2014, 10:00:00 May 6, 2014, and 09:00:00 May 6, 2014 may be maintained. The closest snapshot which may be selected is 12:00:00 May 6, 2014. The selected snapshot may be obtained from the network-based data store. Please note that some snapshots may be ahead or later than the particular point in time, and thus may not be obtained.

As indicated at 830, log records from a remote version of a files system change log for the file system corresponding to updates to the file system between the respective point in time of the for the snapshot and the desired particular point in time for the duplicate version of the file system may be obtained, in various embodiments. As with the snapshots, the remote version of the file system change log may be maintained in a network-based data store. Either the specific log records may be requested or all of the log records may be requested and then later narrowed down to the specific log records. For both obtaining the snapshot and obtaining the log records, access credentials may be included with requests for the snapshot and log records. For instance, a user name/password, key, token, or other identifier may be provided such that the network-based data store may be able to verify the requesting device's authorization to obtain the snapshot and log records.

As indicated at 840, the updates described by the obtained log records may be applied to the snapshot to generate the duplicate version of the file system, in various embodiments. Similar to the discussion above in FIG. 7 with regard to elements 750 and 760, although one log record may describe an update, multiple log records (e.g., 2 or more) may also describe a particular update. Log records for one update may be said to correspond to a single transaction. Thus, in some embodiments applying the updates may correspond to applying transactions. However, sometimes transactions may be incomplete. As above, only complete transactions may be applied in some embodiments. Once generated, the duplicate version of the file system may be made available for access, as indicated at 850. In some embodiments, the type of access may be limited, such as read-only access, as well as the portion of the file system accessible. For example, in some embodiments an access control mechanism may be enforced such that access to a particular portion of a duplicate version of the file system is limited to particular users. However, in some embodiments, the duplicate version of the file system may allow full read and write access to multiple users.

Journaling file systems implementing remote durable logging may be configured to interact with a network-based system or service, such as journaling file system service 400 described above with regard to FIG. 4, which may optimize or extend the capabilities of the file system in a distributed and/or network-based manner. For instance, a duplication system or service may be implemented by an administrator, developer, or other entity responsible for managing, maintaining, or utilizing a file system in multiple contexts. Consider the scenario where one or more versions of a file system may be useful in the performance or operation of other systems. Duplicate versions of the file system may be made available to these other systems. An owner, manager or controller of the file system, updates or changes to the file system may be pushed out to or applied to duplicate versions of the file system, without having to deal with consistency problems caused by multiple accesses to a file system. Moreover, as the versions of the file system may be restored to particular points in time (e.g., to run particular tests on a particular data set), such as discussed above with regard to FIG. 8, the amount, type, or version of data exposed to others may be controlled.

Figure 9:
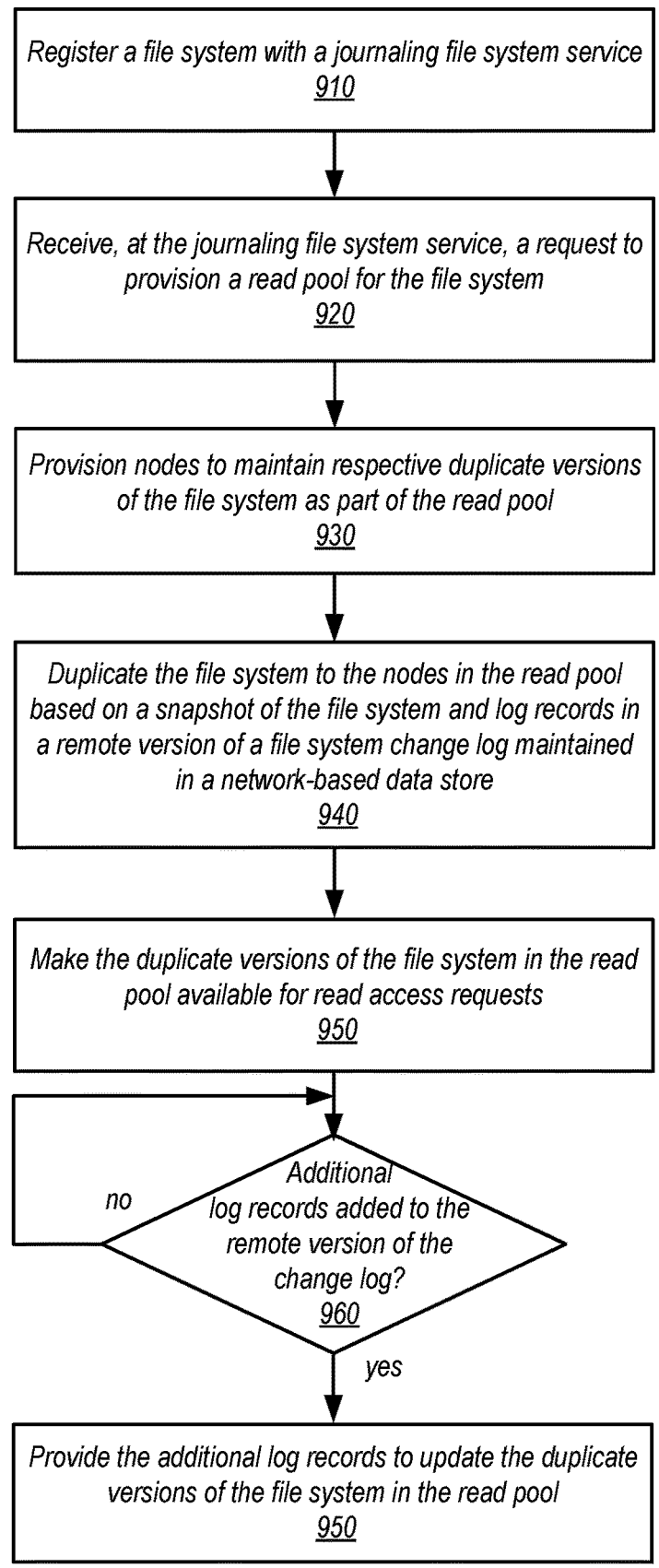
FIG. 9 is a high-level flowchart for illustrating methods and techniques for provisioning a read pool for a duplicated version of a file system, according to some embodiments.

Read pools are one technique which may allow multiple readers to access a pool of nodes or compute instances maintaining a duplicate version of a file system for read access. A journaling file system service may coordinate, manage, and/or otherwise provide read pools, in some embodiments. FIG. 9 is a high-level flowchart for illustrating methods and techniques for provisioning a read pool for a duplicated version of a file system, according to some embodiments. As indicated at 910, in some embodiments, the file system with is to be accessed via the read pool may be registered with the journaling file system service. For example, an account or other identification may be provided. In some embodiments, access credentials to stored snapshots, files system change logs, or other information about the file system that may be stored in a remote data storage system may be provided. The registration request, as well as other requests discussed below, may be formatted according to a programmatic interface (API) for the journaling file system service, in some embodiments.

As indicated at 920, a request to provision a read pool may be received for the file system, in various embodiments. For example, the request may include the expected workload or other information necessary to provision enough resources (e.g., nodes) in the read pool to handle expected read requests, number of distinct connections, or other information related to handling the read access workload. The request to provision may, for instance, include information indicating that the read pool is expected process 20,000 I/O per Second (IOPS). In some embodiments, the provision request may explicitly request a particular number of resources, nodes or instances, to be included in the read pool. Please note, that in some embodiments a read pool may include a single node or compute instance. The request to provision may also include a particular point in time, which may not be the current state of the file system, to provide as a duplicate version (e.g., including a particular time stamp, log record number or snapshot version).

As indicated at 930, nodes (or compute instances) may be provisioned to maintain respective duplicate versions of the file system as part of the requested read pool. Continuing with the example above, if 20,000 IOPS are expected, then 3 nodes (each capable of handling 8,000 IOPS) may be provisioned. In some embodiments, nodes or compute instances may be provisioned from another service, such as described above with regard to FIG. 5. However, a journaling file system service, or other system or service, implementing these techniques may control nodes as part of the respective service without accessing or provisioning from another service.

As indicated at 940, a version of the file system may be duplicated to each of the provisioned nodes to be included in the read pool, in various embodiments. As discussed above with regard to FIG. 8, a snapshot of the file system and log records from a remote file system change log may be obtained. The updates described by the log records may be applied to the snapshot in order to generate the duplicate version of the snapshot at the particular point in time (as may be indicated in the provision request). Once the read pool members maintain the respective duplicate versions of the file system, the duplicate versions of the files system in the read pool may be made available for read access requests, in various embodiments, as indicated at 950. Different read pool nodes may be made available at different times as duplicating file systems may be performed in parallel. For instance, in some embodiments, some storage nodes may be have a complete version of the file system read for access before other storage nodes. Available storage nodes may be marked or identified in various ways as available. For example, load balancers, or other gate keepers between nodes of the read pool and requesting systems may be activated. In some embodiments, read clients or other devices accessing the read pool may send status requests to a service front end or other component to obtain information about which storage nodes in a read pool are available for servicing read requests. Other information, such as the particular version of the file system, the last committed change included in the file system or other information may also be obtained.

In some embodiments, it may be desirable to update the duplicated versions of the file system according to updates made to the file system. Thus, as illustrated at 960, in some embodiments it may be determined whether additional log records or other updates that occur after the point in time associated with the duplicated versions may be stored in the remote version of the file system change log. This determination may, in some embodiments, be manually directed or invoked by the file system owner (e.g., sending a request to the journaling file system service to update the read pool to a specific version of the file system). The additional log records to update the duplicate versions of the file system may be provided to the nodes implementing the read pool, as indicated at 950. The read pool nodes may be configured to receive the log records and apply them to generate an updated version of the file system. In some embodiments, dynamic updates may be provided, such that when changes to the file system are detected, the additional log records may be automatically provided to the nodes in the read pool.

Although the discussion with regard to read pools given above is focused on providing read access, similar techniques may be implemented to provide other systems or devices a duplicated version of the file system, for which read and write access may be allowed. Thus, the previous discussion is not intended to be limiting.

Once provisioned, read pools may provide greater availability for other systems, components or devices to access a file system and data maintained therein. The greater the number of nodes, instances, or other systems or devices that offer a duplicated version of the file system for read access, the greater the availability. However, some systems or techniques that utilize read pools may have changing workloads. For instance, a read pool that is utilized for provide read access to a file system in support of a website may see significant read traffic fall during night hours. Whether the change is predictable, or unpredictable, dynamic scaling of the number of resources in a read pool may provide resource savings and greater efficiency. FIG. 10 is a high-level flowchart for illustrating methods and techniques for scaling read pools for a version of a file system, according to some embodiments. Various components of a journaling file system service, such as illustrated above in FIG. 4, may perform the described methods and techniques, such as dynamic scaling module 414. However, other systems or services that manage or coordinate file systems, data stores, or computing devices may also implement the below techniques. Thus, the previous example is not intended to be limiting.

As indicated at 1010, the read requests received at a read pool may be monitored to detect a scaling event for the read pool, in various embodiments. A load balancer, traffic coordinator, or other gatekeeper for the read pool may evaluating the incoming traffic for the read pool and report various traffic metrics or rates, expected TOPS (I/O Operations per Second), or other information to a monitoring component. In some embodiments, nodes that are members of the read pool may themselves report their received traffic, and a monitor or other component configured to analyze the incoming read requests for the read pool may be to aggregate the information for further analysis.

In at least some embodiments, the number of incoming access requests, or the work required to service the number of incoming access requests for the read pool may be determined. For example, the number of IOPS expected to be utilized to service the incoming read requests may be determined or estimated based on the number of incoming read requests. More generally, any metric that may indicate the throughput capacity of the read pool to process read requests may be determined. Once determined, the throughput, or number of read requests, may be compared to various thresholds to identify specific scaling events.

For example, as indicated at 1020, if the number of read requests exceeds a throughput capacity threshold, then a scaling event may be triggered. The capacity of the nodes implementing the read pool to process read requests may be determined, in some embodiments. Based on this processing capacity, a throughput capacity threshold may be identified that sets an upper limit on the capacity at which the particular number of nodes in the read pool should collectively process read requests. If, for example, the total processing capacity for a group of 4 nodes is 32,000 IOPS, then a throughput capacity threshold may be set at 80% of the total processing capacity of the read pool (e.g., 25,600 IOPS). Thus, if 30,000 IOPS are necessary to process the number or rate of read requests received at the read pool, then the scaling event may be triggered. As indicated by the positive exit from 1020, one or more additional nodes or compute instances may be added to be included in the read pool, as indicated at 1030, in some embodiments. The version of the file system currently maintained for the read pool may be duplicated to the new nodes or virtual compute instances by copying the appropriate snapshot and applying the log records from the remote version of the file system change log, as discussed above with regard to FIG. 8. Load balancers, or other coordination components for the read pool may be notified in order to make the additional nodes or instances available to begin process read requests for the read pool.

Other types of scaling events may be triggered that reduce the resources in the read pool. For example, as indicated at 1040, if the number or rate of received read requests (or the workload for the received read requests) falls below a throughput utilization threshold, then a scaling event may be triggered. As noted above, the total processing capacity for the read pool may be determined. Based on this total processing capacity, a throughput utilization threshold may be identified that provides an indication of when the particular number of nodes in the read pool are not sufficiently utilized for processing read requests. If, for example, the total processing capacity for a group of 4 nodes is 32,000 IOPS, then a throughput utilization threshold may be set at 20% of the total processing capacity of the read pool (e.g., 6,400 IOPS). Thus, if 5,000 IOPS are necessary to process the number or rate of read requests received at the read pool, then the scaling event may be triggered. As indicated by the positive exit from 1040, one or more nodes or compute instances in the read pool may be removed from the read pool, as indicated at 1030, in some embodiments. In this way, the utilization of individual nodes may cause the rate or number of received requests to rise above the throughput utilization threshold, allow for more efficient use of resources. Load balancers, or other coordination components for the read pool may be notified in order to remove or prevent read requests from being sent to the removed nodes in the read pool.

As illustrated by the negative exit from 1040, monitoring may occur continually in some embodiments, in order to provide dynamic adjustments to the size of the read pool for changing workloads. However, in some embodiments, a schedule or otherwise previously defined schema for adding and removing nodes in the read pool may be implemented. Consider the scenario, where a workload for a read pool is predictable. A schedule or plan for sizing the read pool may be defined and implemented so that the read pool is adjusted accordingly. However, even in such scenarios, dynamic scaling may still be implemented to handle unexpected read access changes.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 11:
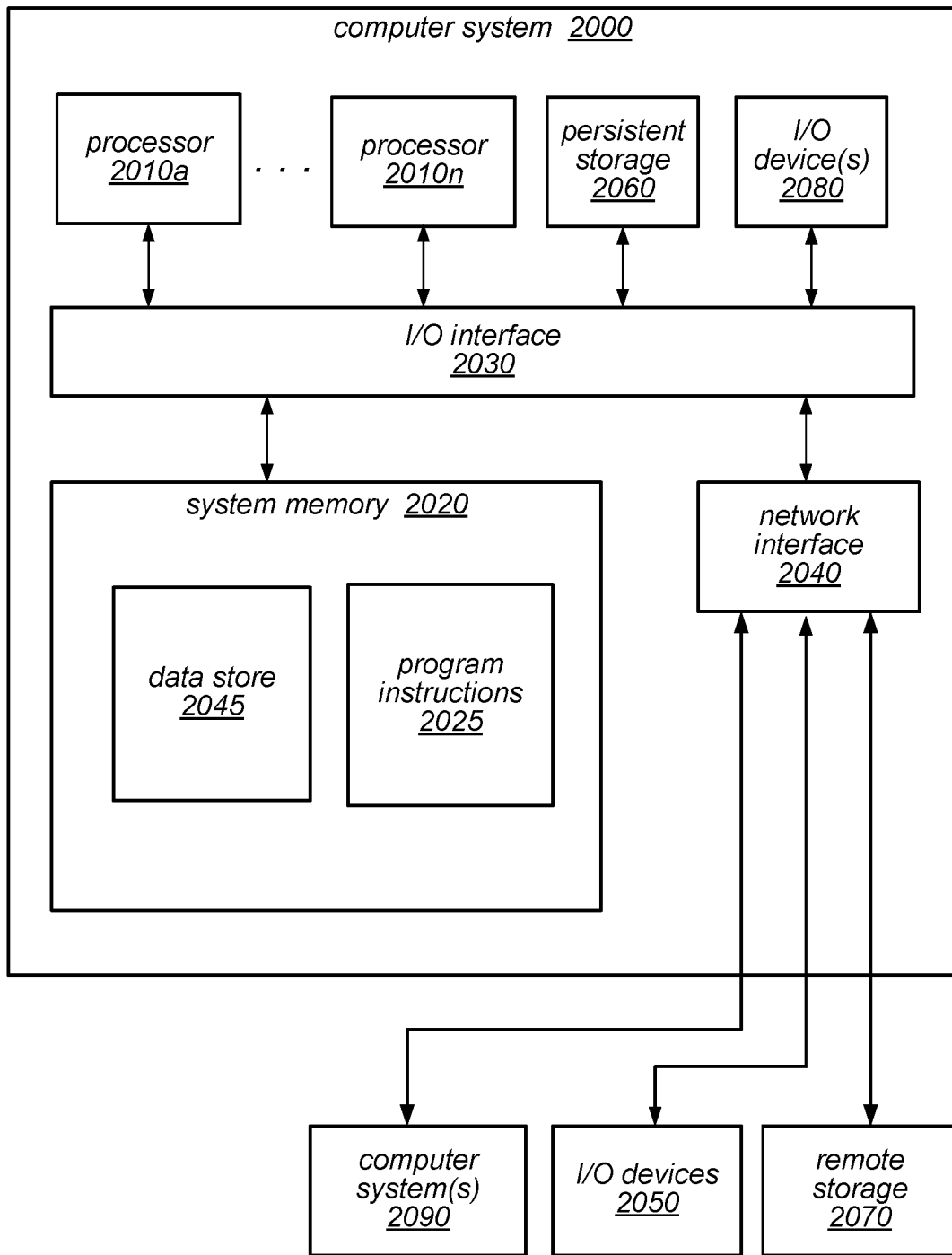
FIG. 11 is an example computer system, according to various embodiments.

FIG. 11 is a block diagram illustrating a computer system configured to implement remote durable logging for journaling file systems, as described herein, according to various embodiments. For example, computer system 2000 may be configured to implement a client device, or one of a plurality of nodes or components of a network-based storage system or journaling file system service that are used to interact with remote versions of file system change logs, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the network-based services described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of journaling file system manager, or one of a plurality of nodes of a network-based service, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the network-based storage system may be stored in data store 2045 or in another portion of system memory 2020 on one or more nodes, in persistent storage 2060, and/or on one or more remote storage devices 2070, at different times and in various embodiments. Similarly, the information described herein as being stored may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more nodes implementing network-based services, and/or clients as described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a storage node within the storage service may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more persistent, block storage devices configured to maintain a file system and a local file system change log;
   one or more processors and a memory that implement a journaling file system manager, configured to:
   receive a request to update the file system, the update modifying an object in the file system;
   in response to receipt of the request, store one or more log records indicating the update in a local file system change log;
   acknowledge the update as committed;
   send one or more requests to a network-based data store to add the one or more log records in the local file system change log to a remote version of the file system change log at the network-based data store, wherein the remote version of the file system change log stores a plurality of previously received log records indicating respective previously received updates for the file system;
   subsequent to a determination that the one or more log records are stored in the remote version of the file system change log at the network-based data store, reclaim storage space in the one or more block storage devices that persists the one or more log records; and
   responsive to a determination to generate a duplicate version of the file system:
   obtain a set of log records from the remote version of the file system change log at the network-based data store;
   reconcile the set of log records obtained from the remote version of the change log with log records in the local file system change log, wherein the reconciliation selects overlapping updates in the local file system change log and the remote version of the change log only once to determine a complete sequence of updates made to the file system after a snapshot of the file system; and apply the complete sequence of updates in the set of log records obtained to the snapshot to generate the duplicate version of the file system.

2. The system of claim 1, wherein to obtain the snapshot of the file system, the journaling file system manager is configured to:

obtain the snapshot from the network-based data store, wherein the network-based data store stores a plurality of snapshots of the file system taken at different points in time.

3. The system of claim 2, wherein to obtain the snapshot and the set of log records from the network-based data store, the journaling file system manager is configured to:

send to the network-based data store one or more access requests for the snapshot and the set of log records, wherein the one or more access requests includes a set of access credentials, and the access credentials are used by the network-based data store to verify authorization for the one or more access requests.

4. The system of claim 1, wherein to make the duplicate version of the file system available for access, the journaling file system manager is configured to perform one or more of:

make the duplicate version of the file system to be read-only;

limit access to the duplicate version of the file system to one or more particular users; and limit access for a particular user to a particular portion of the duplicate version of the file system.

5. The system of claim 1, wherein the journaling file system manager is configured to send the one or more log records to the network-based data store asynchronously with respect to the storing of the one or more log records in the local file system change log.

6. The system of claim 1, wherein the journaling file system manager is configured to send the one or more log records to the network-based data store in parallel via multiple threads or processes, and the one or more log records include respective sequence numbers indicating their sequence order.

7. The system of claim 1, wherein the journaling file system manager is implemented as part of a file system service implemented on a service provider network, and the network-based data store is implemented in a distributed storage service implemented on the service provider network.

8. The system of claim 1, wherein the network-based data store is implemented in a distributed, multi-tenant storage service, wherein the remote version of the file system change log is linked to a particular storage account of the distributed, multi-tenant storage service, and wherein the distributed, multi-tenant storage service maintains data for a plurality of other storage accounts.

9. The system of claim 1, wherein the journaling file system manager is implemented on a client device maintaining the file system and the local file system change log, and the network-based data store is implemented in a network-based storage service remote from the client device.

10. The system of claim 1, wherein the journaling file system manager is configured to:

receive a request to create a read pool for the file system; and provision a plurality of nodes for the read pool in response to the request, wherein the generation of the duplicate version of the file system is performed for individual nodes of the read pool.

11. The system of claim 10, wherein the journaling file system manager is configured to:

detect that additional log records are added to the remote version of the file system change log; and provide the additional log records to plurality of nodes in the read pool.

12. The system of claim 10, wherein the journaling file system manager is configured to:

monitor the read pool for scaling events for the read pool;

responsive to a first scaling event, provision one or more additional nodes for the read pool and generate one or more additional duplicate versions of the file system for additional nodes; and responsive to a second scaling event, remove one or more nodes from the read pool.

13. The system of claim 12, wherein to monitor the read pool for scaling events, the journaling file system manager is configured to monitor a throughput level of the read pool.

14. The system of claim 10, wherein to provision the plurality of nodes for the read pool, the journaling file system manager is configured to provision a plurality of virtual compute instances.

15. The system of claim 10, wherein the journaling file system manager is configured to activate a load balancer to coordinate request traffic for the nodes in the read pool.

16. A method, comprising:

performing, by one or more computing devices:

receiving a request to update a file system, the update modifying an object in the file system;

storing one or more log records indicating the update in a local file system change log, wherein the local file system change log is stored in a persistent data store and is locally-accessible to the one or more computing devices;

acknowledging the update as committed;

sending one or more requests to a network-based data store to add the one or more log records in the local file system change log to a remote version of the file system change log at the network-based data store, wherein the remote version of the file system change log stores a plurality of previously received log records indicating respective previously received updates for the file system;

subsequent to a determination that the one or more log records are stored in the remote version of the file system change log at the network-based data store, reclaiming storage space maintaining the one or more log records in the persistent data store; and responsive to a determination to generate a duplicate version of the file system:

obtaining a set of log records from the remote version of the file system change log at the network-based data store;

reconciling the set of log records obtained from the remote version of the change log with log records in the local file system change log, wherein the reconciliation selects overlapping updates in the local file system change log and the remote version of the change log only once to determine a complete sequence of updates made to the file system after a snapshot of the file system; and applying the complete sequence of updates in the set of log records obtained to the snapshot to generate the duplicate version of the file system.

17. The method of claim 16, wherein obtaining the snapshot of the file system comprises:
    obtaining the snapshot from the network-based data store, wherein the network-based data store stores a plurality of snapshots of the file system taken at different points in time.

18. The method of claim 16, further comprising performing, by the one or more computing devices:
    receiving a request to create a read pool for the file system; and
    provisioning a plurality of nodes for the read pool in response to the request, wherein the generation of the duplicate version of the file system is performed for individual nodes of the read pool.

19. The method of claim 18, further comprising performing, by the one or more computing devices:
    detecting that additional log records are added to the remote version of the file system change log; and
    providing the additional log records to plurality of nodes in the read pool.

20. The method of claim 18, further comprising performing, by the one or more computing devices:
    monitoring the read pool for scaling events for the read pool;
    responsive to a first scaling event, provisioning one or more additional nodes for the read pool and generating one or more additional duplicate versions of the file system for additional nodes; and
    responsive to a second scaling event, removing one or more nodes from the read pool.

* * * * *